United States Patent

Chen et al.

[11] Patent Number: 5,806,021
[45] Date of Patent: Sep. 8, 1998

[54] AUTOMATIC SEGMENTATION OF CONTINUOUS TEXT USING STATISTICAL APPROACHES

[75] Inventors: Chengjun Julian Chen, White Plains; Fu-Hua Liu, Elmsford; Michael Alan Picheny, White Plains, all of N.Y.

[73] Assignee: International Business Machines Corporation, Armonk, N.Y.

[21] Appl. No.: 700,823

[22] Filed: Sep. 4, 1996

Related U.S. Application Data

[60] Provisional application No. 60/008,120, Oct. 30, 1995.

[51] Int. Cl.⁶ .............................. G06F 17/27; G06F 17/20
[52] U.S. Cl. .................................. 704/9; 704/1; 704/257; 707/531
[58] Field of Search ........................... 704/1, 9, 10, 241, 704/242, 254, 255, 256, 257; 707/530, 531, 534, 535, 536

[56] References Cited

U.S. PATENT DOCUMENTS

| | | |
|---|---|---|
| 4,069,393 | 1/1978 | Martin et al. ............................ 704/255 |
| 4,750,122 | 6/1988 | Kaji et al. ................................... 704/1 |
| 5,029,084 | 7/1991 | Morohasi et al. ........................... 704/9 |
| 5,199,077 | 3/1993 | Wilcox et al. .......................... 704/256 |
| 5,425,129 | 6/1995 | Garman et al. ......................... 704/256 |
| 5,448,474 | 9/1995 | Zamora ....................................... 704/9 |
| 5,655,058 | 8/1997 | Balasubramanian et al. .......... 704/255 |
| 5,657,424 | 8/1997 | Farrell et al. ........................... 704/255 |
| 5,706,397 | 1/1998 | Chow ....................................... 704/243 |

*Primary Examiner*—David R. Hudspeth
*Assistant Examiner*—Matthew J. Lestina
*Attorney, Agent, or Firm*—Whitham, Curtis & Whitham; Robert P. Tassinari

[57] ABSTRACT

An automatic segmenter for continuous text segments such text in a rapid, consistent and semantically accurate manner. Two statistical methods for segmentation of continuous text are used. The first method, called "forward-backward matching", is easy and fast but can produce occasional errors in long phrases. The second method, called "statistical stack search segmenter", utilizes statistical language models to generate more accurate segmentation output at an expense of two times more execution time than the "forward-backward matching" method. In some applications where speed is a major concern, "forward-backward matching" can be used, while in other applications where highly accurate output is desired, "statistical stack search segmenter" is ideal.

9 Claims, 5 Drawing Sheets

AUTOMATIC SEGMENTATION OF CONTINUOUS TEXT USING STATISTICAL APPROACHES

DESCRIPTION

This application claims benefit of Provisional application no. 60/008,120, filed Oct. 30, 1995, now abandoned.

BACKGROUND OF THE INVENTION

1. Field of the Invention

The present invention generally relates to automatic segmenters for continuous text and, more particularly, to systems which achieve automatic segmentation for languages in which native orthographic text is written without word boundary demarcations.

2. Background Description

The written forms of several important Asian languages do not have word boundaries. These languages include Chinese, Japanese, Thai (Siamese) Vietnamese, and Korean. In the case of Chinese, the text is a string of Chinese characters, with punctuation, numbers, Roman letters, etc. in the case of Japanese, the text is a mixture of Chinese characters (Kanji), two kinds of Japanese phonetic characters (katakana and hiragana), Roman letters, numbers, and punctuation. In the case of Thai, the text is a continuous string of Thai letters (which have an appearance similar to Arabic or Hindu), and the white space is used to delimitate phrases. In the case of Korean, the text is a string of Hangul syllables, and the white space is used to delimitate phrases, not words. In the case of Vietnamese, the white space is used in delimitating syllables; that is to say, each syllable is delimitated by white spaces or punctuation.

Within a sentence, for all the above languages, there are delimitators that correspond to beginning or end of words. Word segmentation usually does not start with complete sentences. Thus, the starting point is a shorter string we call a "phrase". For the purposes of this invention, we define the term "phrase" as an unsegmented string of syllables bounded by well-defined word boundaries. Specifically,

- for Chinese, a phrase is defined as a continuous string of Chinese characters (hanzi) bounded by the beginning of a paragraph, punctuation(s), Arabic number(s), or Roman letter(s);
- for Japanese, a phrase is defined as a continuous string of Kanji and hiragana, bounded by the beginning of a paragraph, katagana(s), Roman letter(s), number(s), or punctuation(s);
- for Thai, a phrase is defined as a continuous string of Thai letters;
- for Korean, a phrase is defined as a continuous string of Hangul; and
- for Vietnamese, a phrase is defined as a continuous string of Vietnamese syllables.

All the phrases contain at least one word, and may contain multiple words as a subject of word segmentation.

In many applications that rely on availability of explicit word boundaries, word segmentation is usually executed with human intervention. The fact that word boundaries in these languages are ambiguous and may be arbitrarily defined makes manual segmentation in these languages difficult, slow, and effort-demanding. Moreover, manual segmentation produces inconsistent segmentation output due to the lack of simple rules for regulating word boundaries. It is therefore desirable to implement automatic segmenters for continuous text in a rapid, consist and, more importantly, semantically accurate manner.

For all these languages, word segmentation is required for making language models in speech recognition, in information retrieval, or text-to-speech conversion. More particularly, the applications for word segmenters include the following:

- Speech recognition (to train acoustic models and language models) for both continuous and isolate word recognition,
- Speech synthesis as character pronunciations for homograph can be resolved when the words that characters compose are uniquely determined,
- Word-based information retrieval,
- A stand-alone product for machine translation, and
- Update of lexicon for other text analysis.

SUMMARY OF THE INVENTION

It is therefore an object of the present invention to provide an implementation of an automatic segmenter for continuous text which segments such text in a rapid, consistent and semantically accurate manner.

According to the invention, there is provided two statistical methods for segmentation of continuous text. The first method, called "forward-backward matching", is easy and fast but can produce occasional errors in long phrases. The second method, called "statistical stack search segmenter", utilizes statistical language models to generate more accurate segmentation output at an expense of two times more execution time than the "forward-backward matching" method. In some applications where speed is a major concern, "forward-backward matching" can be used alone, while in other applications where highly accurate output is desired, "statistical stack search segmenter" is ideal. By using "forward-backward matching" first followed by the "statistical stack search segmenter", highly accurate output is achieved in minimal time.

In "forward-backward matching", word boundaries are located by forming the longest word which exists in the lexicon (longest allowable word) in both forward and backward manners. Likelihood from statistical language models is only used to make a decision when there is any output discrepancy between forward and backward matchings. In "statistical stack search segmenter", word boundaries are obtained in the sense of maximum likelihood using knowledge of statistical language models (including uni-gram, bi-gram, tri-gram, and higher-order grammers) in addition to the ensemble of valid words. For purpose of computational reduction, a forward, backward or foward-backward matching algorithm is incorporated as a fast match step to eliminate unlikely output. The system can be extended to handle new words by specifying a "new words" list.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

This invention has been implemented on an IBM RISC/6000 Workstation running under IBM's AIX (a version of UNIX) operating system; however, the invention is independent of hardware platform and operating system. For example, an implementation of the invention is being prepared to run on an IBM Personal Computer based on an Intel Pentium microprocessor running under MS Windows 95 operating system, and those skilled in the art that other implementations are possible, including one for the Apple Macintosh computer based on the IBM/Motorola PowerPC microprocessor running under the System 7 operating system.

FORWARD-BACKWARD MATCHING SEGMENTER

The first statistical approach implemented by the automatic segmenter according to the invention is based on a vocabulary with uni-gram probability. It is an extension of a popular segmentation algorithm used by Chinese linguists for several decades. The new element is that the longest matching is taking place in both directions, forward and backward. By locating word boundaries to yield a minimum number of words (or the longest matching for each word), a segmented phrase is formed. Then, the character order of the phrase is reversed and the process of longest matching is repeated. A second segmented phrase is thus formed. If the two are identical, then the result is accepted. If they are different, the likelihoods of both segmentations are calculated. The one with the higher likelihood is chosen as the result.

Figure 1A:
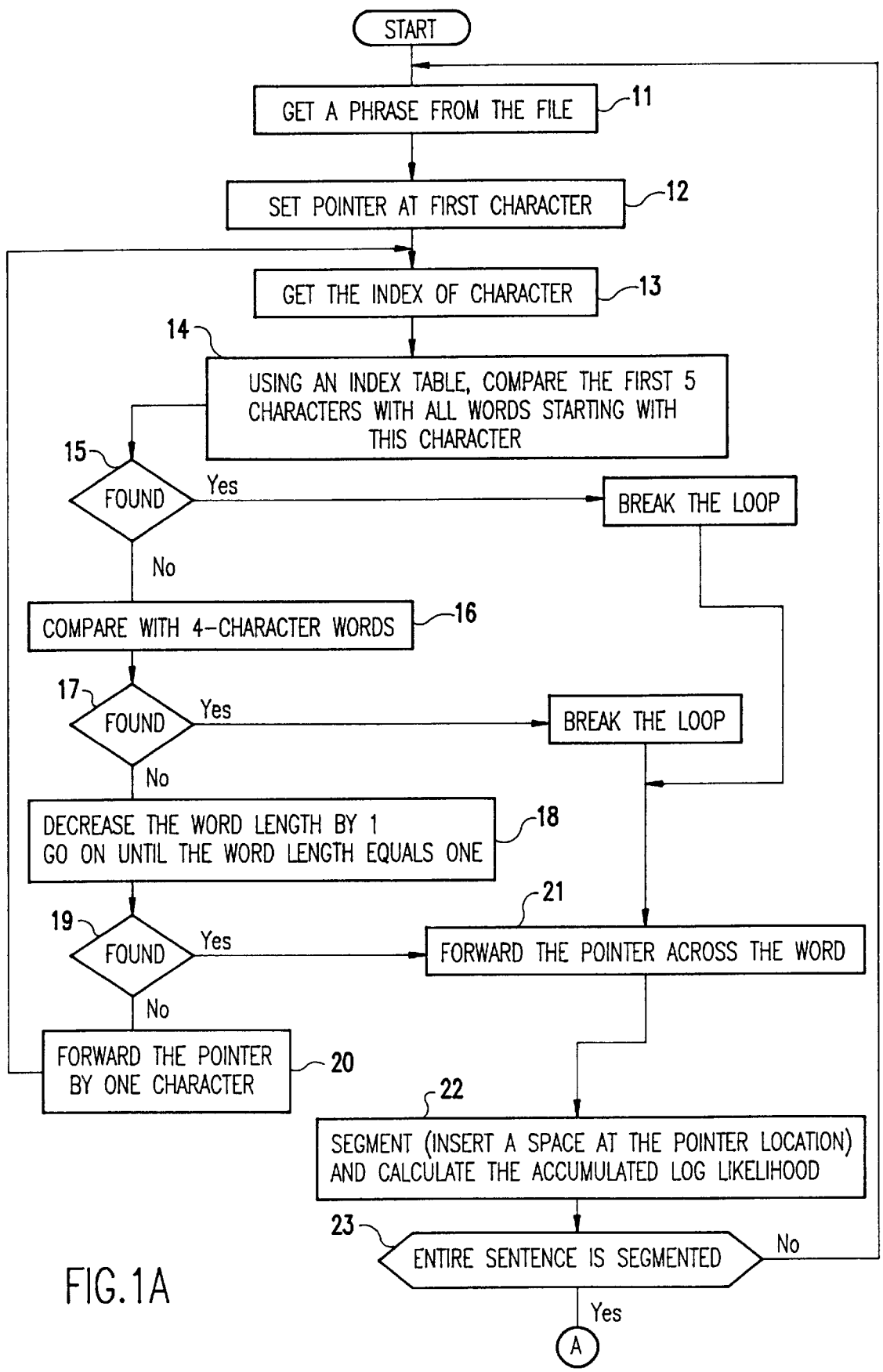
FIGS. 1A to 1C, taken together, are a flow diagram showing the logic of the forward-backward matching method according to the invention.
Figure 1B:
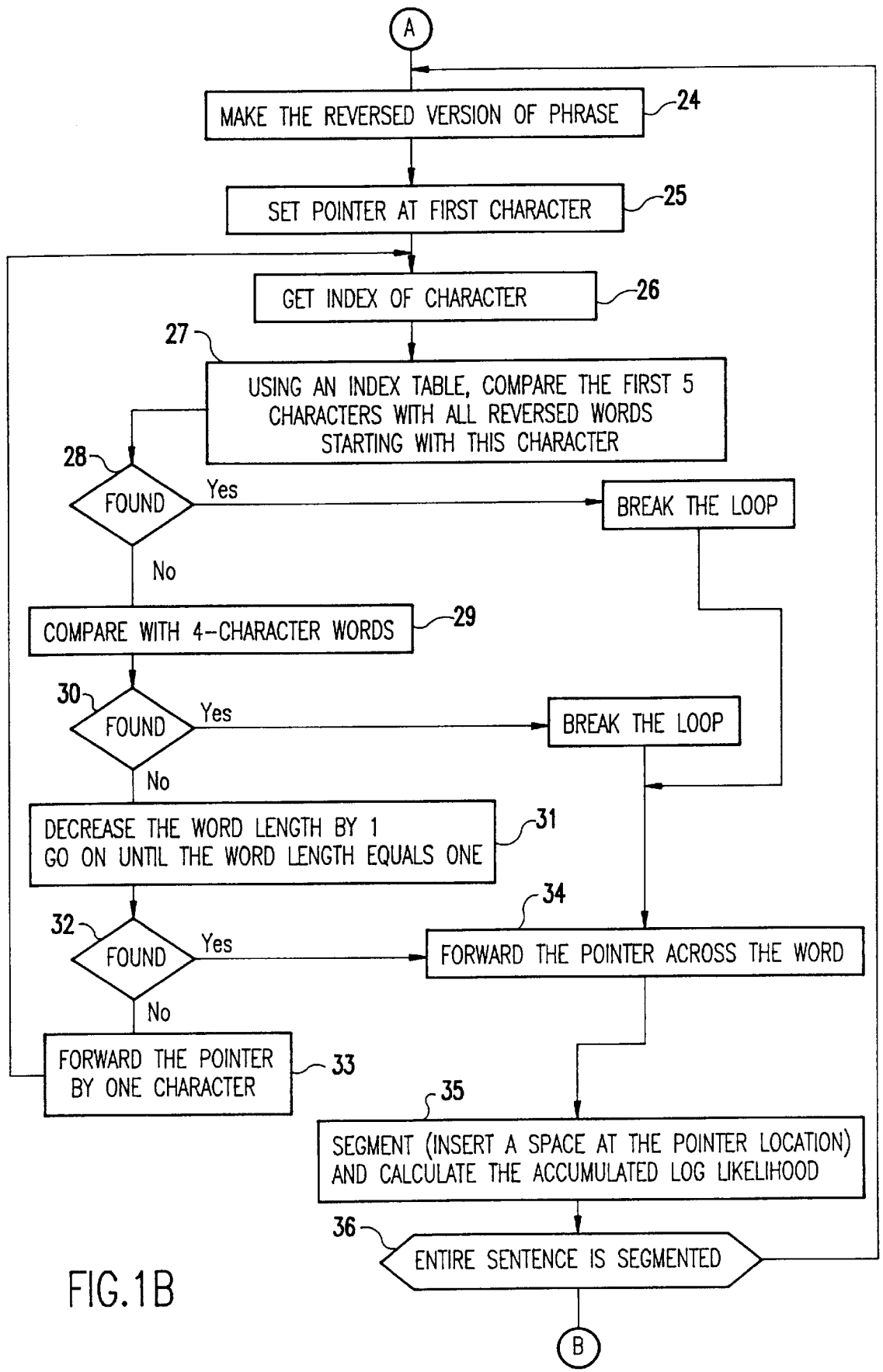
Figure 1C:
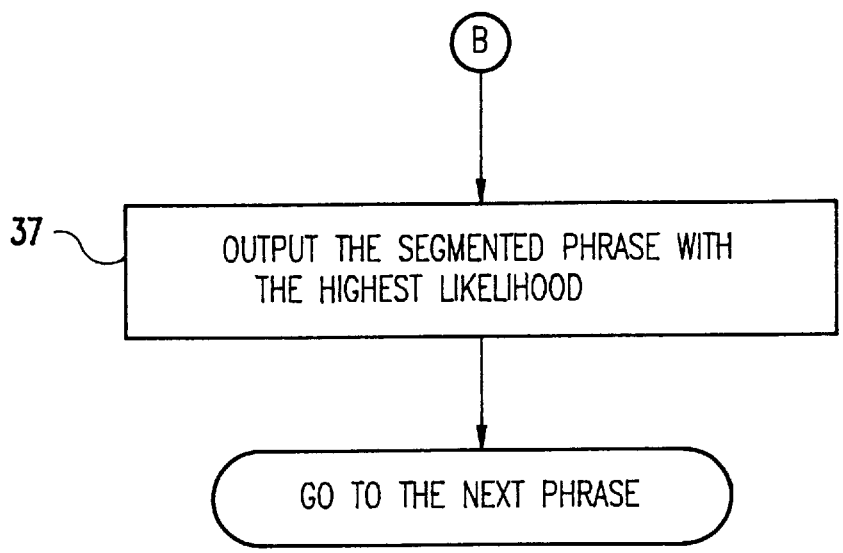

Referring now to the drawings, and more particularly to FIGS. 1A, 1B and 1C, there is shown a flow diagram of the logic of the forward-backward matching method according to the invention. The process starts in function block 11 by getting phrase from the file. A pointer is set to the first character in function block 12, and then the index of the character is retrieved in function block 13. Using an index table, the first N characters are compared with all words starting with this character in function block 14, where N is the maximum word length. N can be any arbitrary number. In a specific implementation of the invention, N was set to five. A test is made in decision block 15 to determine if the character is found. If not, a comparison is made in function block 16 with N-1 character words. Again, a test is made in decision block 17 to determine if the character is found. If not, the word length is decreased by one in function block 18. This process is repeated until the word length equals one. Once again, a test is made in decision block 19 to determine if the character is found. If not, the pointer is advanced by one character in function block 20, and the process loops back to function block 13 to get the index of the new character. Whenever, the tests of decision blocks 15, 17 and 19 indicate that the character has been found, this loop is broken and the pointer is advanced across the word in function block 21. A space is inserted at the new pointer location, thus segmenting the phrase, in function block 22. In addition, a calculation is made of the accumulated log likelihood. A test is next made in decision block 23 to determine if the entire phrase has been segmented. If not, the process loops back to function block 11, and the process is repeated until the phrase is segmented.

This concludes the forward segmentation of the phrase. Next, as shown in FIG. 1B, the reversed version of the phrase is made in function block 24. A pointer is set to the first character in function blox of the character is retrieved in function block 26. Using an index table, the first five characters with all reversed words are compared with all words starting with this character in function block 27. The process is essentially the same as that shown in FIG. 1A. Specifically, a test is made in decision block 28 to determine if the character is found. If not, a comparison is made in function block 29 with four character words. Again, a test is made in decision block 30 to determine if the character is found. If not, the word length is decreased by one in function block 31. This process is repeated until the word length equals one. Once again, a test is made in decision block 32 to determine if the character is found. If not, the pointer is advanced by one character in function block 33, and the process loops back to function block 26 to get the index of the new character. Whenever, the tests of decision blocks 28, 30 and 32 indicate that the character has been found, this loop is broken and the pointer is advanced across the word in function block 34. A space is inserted at the new pointer location, thus segmenting the phrase, in function block 35. In addition, a calculation is made of the accumulated log likelihood. A test is next made in decision block 36 to determine if the entire phrase has been segmented. If not, the process loops back to function block 24, and the process is repeated until the phrase is segmented.

Finally, with reference to FIG. 1C, the segmented phrase with the highest likelihood is output in function block 37. The process then goes to the next phrase.

The following is pseudocode which implements the process illustrated in FIGS. 1A to 1C for N=5:

```
get a phrase from the file
    starting by setting the pointer at the first
        character
    get the index of that character (1–14 6766)
        compare the first 5 characters with all
            words starting with this character, with
            the help of an index table
        if found, break the loop
        if not found, compare with 4-character words
            if found, break the loop
            if not found, decrease the word length by 1
                go on until the word length equals one
        if a word is found, forward the pointer across
            the word
        if not found, forward the pointer by one
    character
        segment (insert a space at the pointer location)
    and calculate the accumulated log likelihood
        go on until the entire phrase is segmented make
    the reversed version of that phrase
        starting by setting the pointer at the first
            character
        get the index of that character (1–6766)
        compare the first 5 characters with all reversed
            words starting with this character, with
            the help of index table
        if found, break the loop
        if not found, compare with 4-character words
            if found, break the loop
            if not found, decrease the word length by 1
                go on until the word length equals one
            if a word is found, forward the pointer
                across the word
        if not found, forward the pointer by one
    character
        segment (insert a space at the pointer location)
    and calculate the accumulated log likelihood
    go on until the entire phrase is segmented
    output the segmented phrase with the highest
        likelihood
go to the next phrase
```

In the fourth line of the foregoing pseudocode, "(1-6766)" is for the case of GB2312-80 code in China. If a phrase has two places with different segmentations, the two (or more) differences should be treated separately. In other words, for each part of the phrase with different segmentation results, the likelihoods would be compared separately.

STATISTICAL STACK SEARCH SEGMENTER

In this approach, word segmentation is implemented so that the output word sequence has a maximum likelihood. This can be done using exhaustive search methods. However, the computational load associated with exhaustive search algorithms is too large to carry out directly. The idea of the Statistical Stack Search Segmenter is to find the optimal word sequence in the sense of maximum likelihood while pruning the unlikely sequence. Furthermore, this can incorporate other simple searching techniques, such as forward matching and- forward-backward matching, to find a sub-optimal path as a pruning threshold to reduce the computation. In this method, a stack search algorithm is applied as the detailed match and forward matching is used as the fast match method. The system utilizes various standard user interface of IBM language models and can be easily extended to other types of lexicon. When a list of new words (segmentations) is provided, the system will automatically handle these words even if they are not in the vocabulary of language models.

Figure 2:
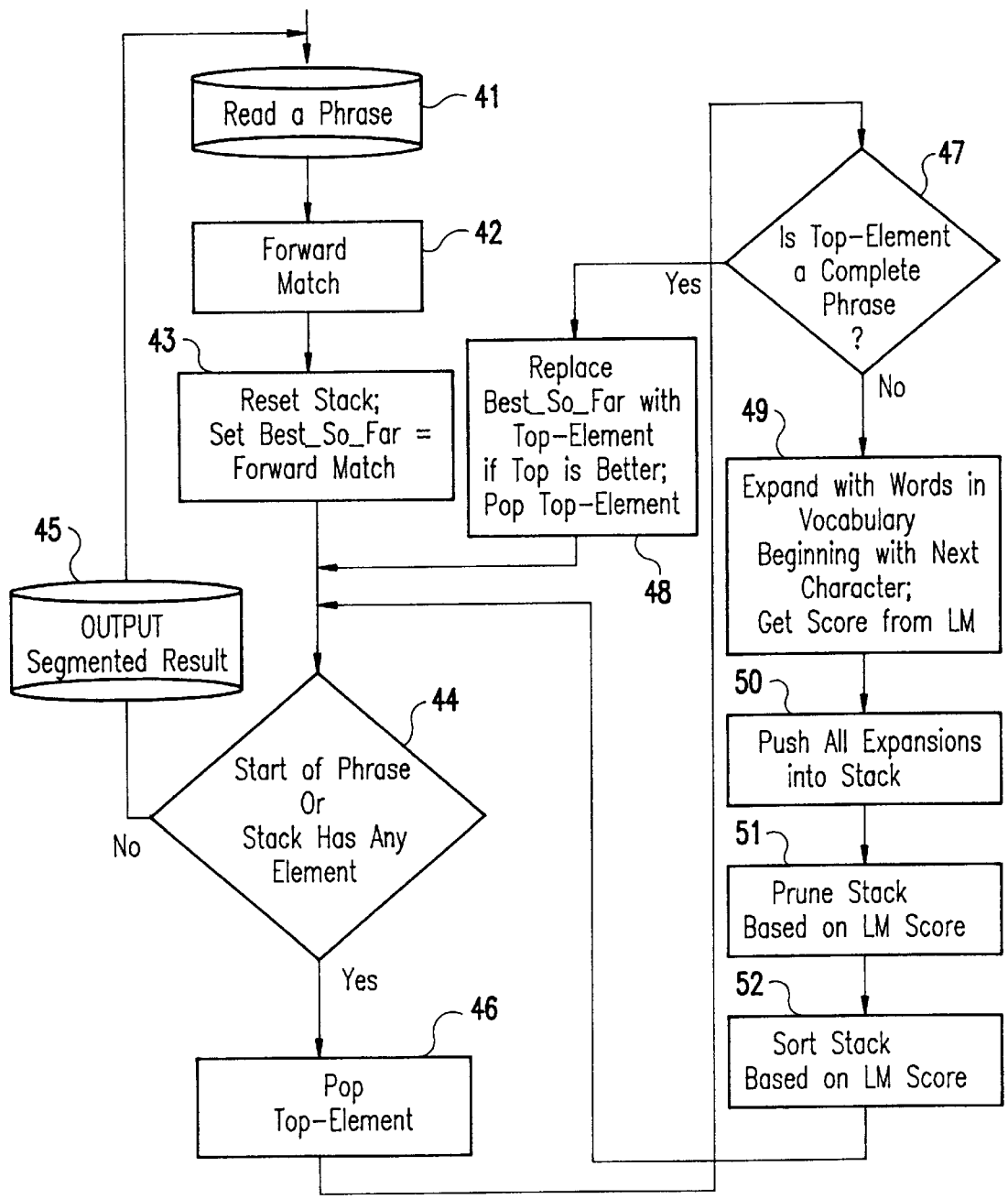
FIG. 2 is a flow diagram showing the logic of the statistical stack search segmenter method according to the invention.

FIG. 2 is a flow diagram showing the logic of the statistical stack search segmenter according to the invention. The process begins by reading a phrase in function block 41. A forward match is made in function block 42, and the stack is reset in function block 43 so that the best match so far is the forward match made in function block 42. Next a test is made in decision block 44 to determine if this is the start of a phrase or if the stack has any elements. If not, the process outputs the segmented result at output 45 before looping back to function block 41 to read a phrase; otherwise, the top element is popped from the stack in function block 46. Another test is made in decision block 47 to determine if the top element is a complete phrase. If so, the best match so far is replaced with the top element if that element is a better match in function block 48, and the process goes back to decision block 44. Otherwise, an expansion is made with words in a vocabulary beginning with the next character in function block 49. A likelihood match (LM) score is obtained for the expansion. Various types of statistical language models can be used to obtain this score, such as bi-gram, tri-gram and other high-order grammars. All expansions are pushed into the stack in function block 50. The stack is pruned based on the LM score in function block 51, and then the stack is sorted based on the LM score in function block 52. At this point, a return is made to decision block 44.

The pseudocode which implements the process illustrated in FIG. 2 is as follows:

```
while (not end of file)
    read a phrase
        [Perform forward matching and obtain the
            likelihood as the pruning threshold]
        set best_result_so_far = forward-matching
        reset stack
        while (stack has any elements or beginning for a
            phrase)
            pop out the top element in stack
                (or set top element to be null if this
                is beginning)
            if (top element is just the complete
                phrase)
                compare top element to
                    best_result_so_far
                set best_result_so_far = top element
                pop out top element
                go back to while loop
            end if
            gather all possible words that begin with
                the next character
            expand the top element with all words found
        in the previous step
                push back the resulted expansions into
        stack
                    prune expansions whose score is below
        best_result_so _far
                    sort the stack by score (top element has
        the best score
            end of while
            output best result_so_far as the segmented
                result
        end of while loop
```

ITERATIVE SEGMENATION

Figure 3:
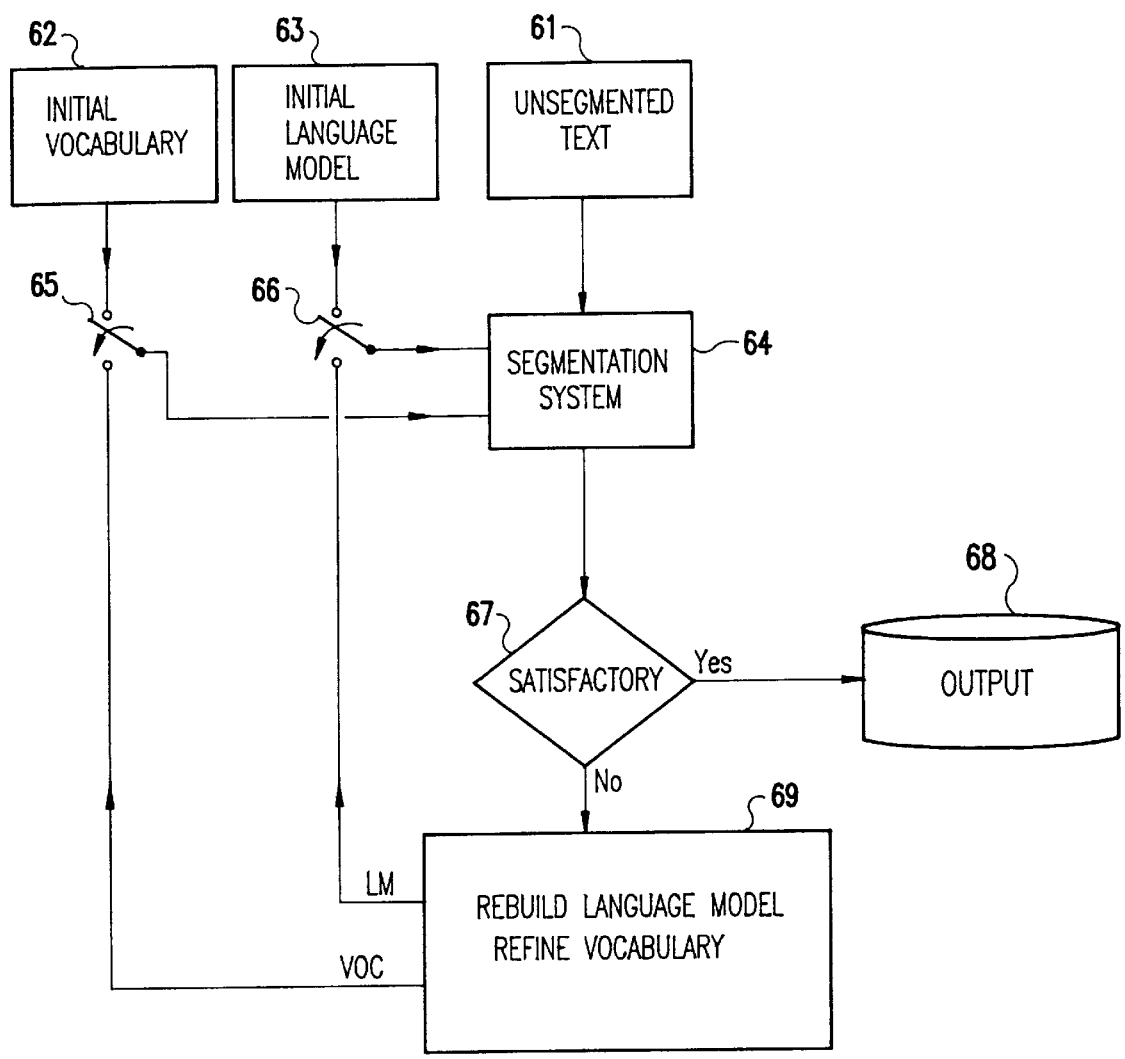
FIG. 3 is a flow diagram showing the logic of an implementation of segmentation in an iterative fashion.

Referring now to FIG. 3 there is shown in flow diagram form the logic of an implementation of segmentation in an interative fashion to refine the language model and vocabulary after each segmentation process. The result is improved segmentation accuracy. The unsegmented text is supplied at input 61. An initial vocabulary is supplied at input 62, and an initial language model is supplied at input 63. These three inputs are input to the segmentation system 64. In the case of inputs 62 and 63, the inputs are initially made by way of switches 65 and 66, respectively. After the first pass through segmentation system 64, switches 65 and 66 are switched to their alternate positions. The segmentation system 64 may be the forward-backward matching segmenter or the statistical stack search segmenter or both. With each pass through the segmentation system 64, a test is made in decision block 67 to determine if the output is satisfactory. If so, the segmented result is output to output 68; otherwise, the language model is rebuilt and the vocabulary is refined in function block 69. The refined vocabulary and rebuilt language model are now input via switches 65 and 66, respectively, to the segmentation system 64 which again segments the unsegmented text. Ultimately, the refined vocabulary and bebuilt language model can be used directly without again using this iterative process.

EXPERIMENTS AND RESULTS

These two methods were tested in two different text corpora. One corpus contains text from news articles with 120 million characters. The other contained text purely from transcription of spontaneous conversations with 220 thousand characters. Segmentation results show that both methods can generate highly semantically accurate word boundaries in a consistent fashion. After segmentation, there are 78 million words in the first news corpus and there are 160 thousand words in the second conversation corpus.

The overall segmentation error of the forward matching method was about 7%. 13% of phrases exhibited different word boundaries if forward matching and backward matching are used alone. 16% of phrases differ in word boundaries if forward matching and Statistical Stack Search Segmenter are applied separately. The segmentation accuracy is better than 98% for the forward-backward matching segmenter and better than 99% for statistical stack Search segmenter.

While the invention has been described in terms of a preferred embodiment implemented in two methods, the second of which is best run after running the first, those skilled in the art will recognize that the invention can be practiced with modification within the spirit and scope of the appended claims.

Having thus described our invention, what we claim as new and desire to secure by letters patent is as follows:

1. A computer implemented method of segmenting continuous text comprising the steps of:
   a) determining a phrase from a string of characters in a first direction;
   b) determining from a beginning of the phrase a longest possible word beginning at the beginning of the phrase;
   c) repeating steps a) and b) until the phrase is completed;
   d) repeating steps a), b) and c) in a direction opposite said first direction, beginning with the end of the phrase and working backwards; and
   e) choosing a result having a higher likelihood than other possible results.

2. The computer implemented method of segmenting continuous text as recited in claim 1, further comprising after step e) the steps of:
   f) searching for every possible word that begins with a first character in the phrase and putting the words in a stack in order of language model likelihood;
   g) expanding a word at a top of the stack with words from a vocabulary by
      g1) starting with a highest likelihood result, searching for every possible word beginning with the character immediately following that word;
      g2) for each next word, computing a probability of a word stream containing that word and preceding words, and putting that word and the preceding words in the stack;
      g3) sorting and pruning the stack based upon the computed probability;
      g4) repeating steps g1), g2) and g3) until a top entry in the stack matches an input string; and
   h) outputting the top of the stack entry as a result.

3. The computer implemented method of segmenting continuous text as recited in claim 2 wherein the step g2) of computing a probability is performed using a statistical language model.

4. A computer implemented method of segmenting continuous text comprising the steps of:
   searching for every possible word that begins with a first character in the phrase and putting the words in a stack in order of language model likelihood;
   expanding a word at a top of the stack with words from a vocabulary by
      a) starting with a highest likelihood result, searching for every possible word beginning with the character immediately following that word;
      b) for each next word, computing a probability of a word stream containing that word and preceding words, and putting that word and the preceding words in the stack;
      c) sorting and pruning the stack based upon the computed probability;
      d) repeating steps a), b) and c) until a top entry in the stack matches an input string; and
   outputting the top of the stack entry as a result.

5. The computer implemented method of segmenting continuous text as recited in claim 4 further comprising, prior to the first step of searching, the initial steps of:
   e) determining a phrase from a string of characters in a first direction;
   f) determining from a beginning of the phrase a longest possible word beginning at the beginning of the phrase; and
   g) repeating steps e) and f) until the phrase is completed.

6. The computer implemented method of segmenting continuous text as recited in claim 4 wherein the step b) of computing a probability is performed using a statistical language model.

7. A computer implemented method of segmenting continuous text comprising the steps of:
   a) inputting unsegmented text;
   b) inputting an initial vocabulary and an initial language model;
   c) segmenting the input unsegmented text;
   d) testing the segmented text to determine if a satisfactory result has been obtained;
   e) outputting the segmented text if the result is satisfactory;
   f) otherwise, refining the vocabulary and rebuilding the language model; and
   g) repeating steps a) and c) using the refined vocabulary and rebuilt language model and again repeating steps d) and f) until the segmented text result is satisfactory.

8. The computer implemented method of segmenting continuous text recited in claim 7 wherein step c) comprises the steps of:
   h) determining a phrase from a string of characters in a first direction;
   i) determining from a beginning of the phrase a longest possible word beginning at the beginning of the phrase;
   j) repeating steps h) and i) until the phrase is completed;
   k) repeating steps h), i) and j) in a direction opposite said first direction, beginning with the end of the phrase and working backwards; and
   l) choosing a result having a higher likelihood than other possible results.

9. The computer implemented method of segmenting continuous text recited in claim 7 wherein step c) comprises the steps of:
   m) searching for every possible word that begins with a first character in the phrase and putting the words in a stack in order of language model likelihood;
   n) expanding a word at a top of the stack with words from a vocabulary by
      n1) starting with a highest likelihood result, searching for every possible word beginning with the character immediately following that word;
      n2) for each next word, computing a probability of a word stream containing that word and preceding words, and putting that word and the preceding words in the stack;
      n3) sorting and pruning the stack based upon the computed probability;
      n4) repeating steps n1), n2) and n3) until a top entry in the stack matches an input string; and
   o) outputting the top of the stack entry as a result.

* * * * *